Figure 1:
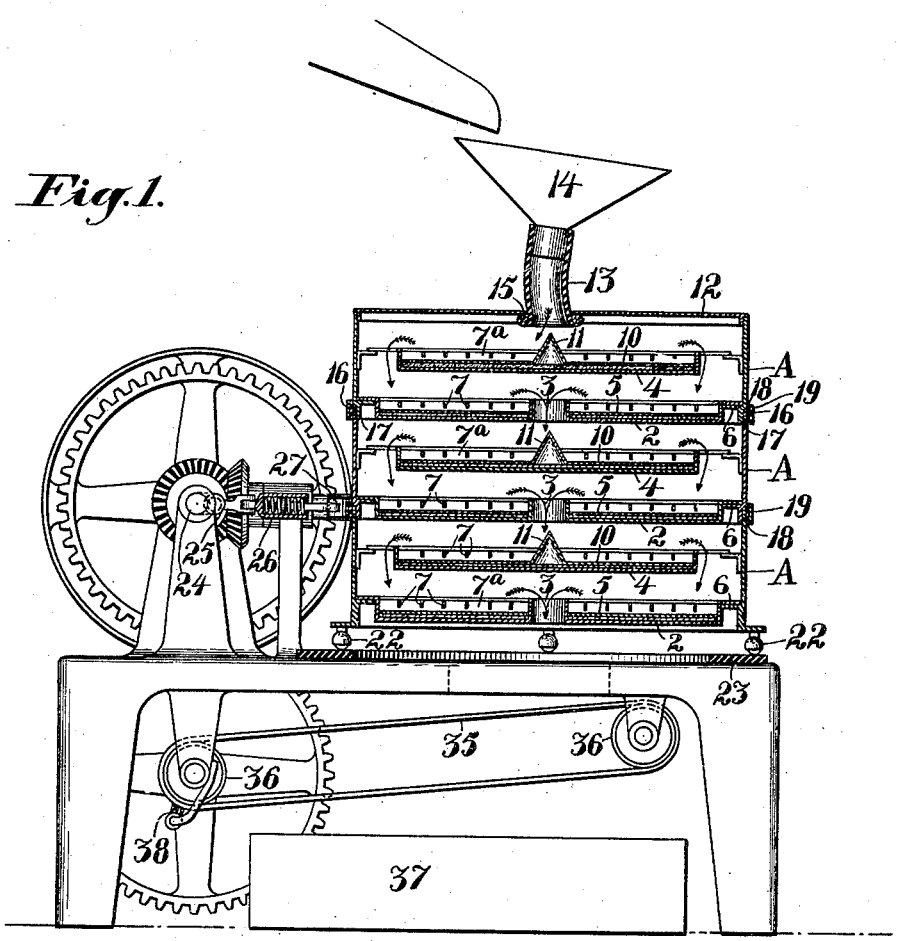

No. 747,268. PATENTED DEC. 15, 1903.
S. C. SZEMANSKI.
GOLD SAVING DEVICE.
APPLICATION FILED SEPT. 8, 1903.
NO MODEL. 2 SHEETS—SHEET 1.

Witnesses:
F. C. Fliedner

Inventor,
Stefan C. Szemanski
By Geo. H. Strong
atty

No. 747,268. PATENTED DEC. 15, 1903.
S. C. SZEMANSKI.
GOLD SAVING DEVICE.
APPLICATION FILED SEPT. 8, 1903.
NO MODEL. 2 SHEETS—SHEET 2.
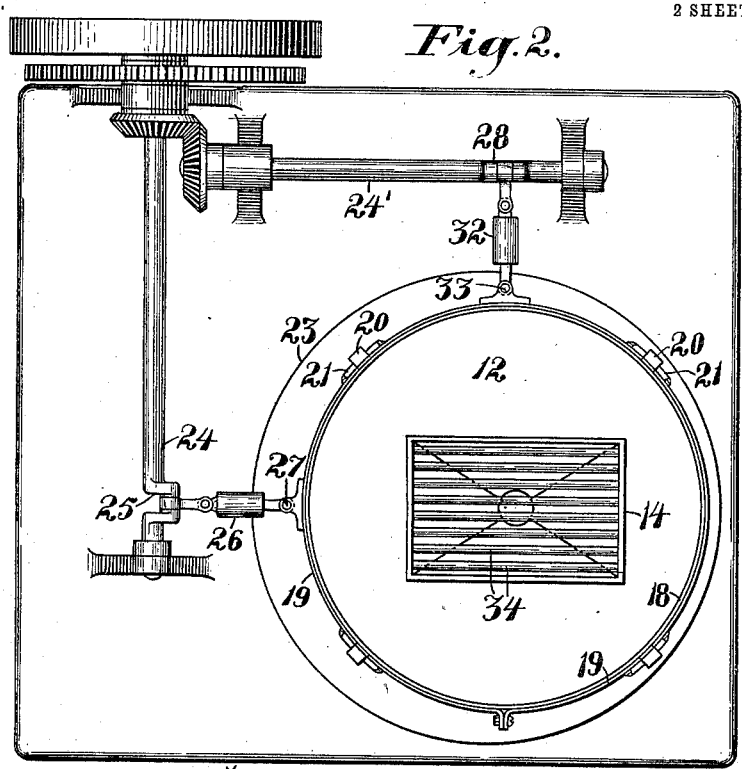
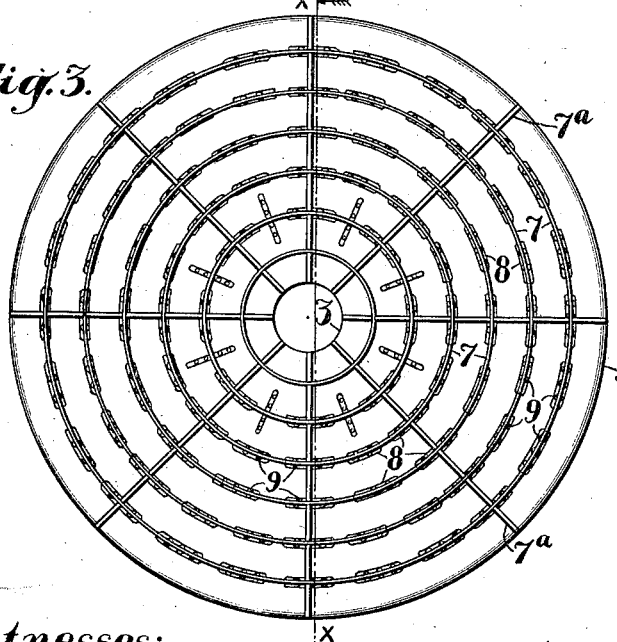
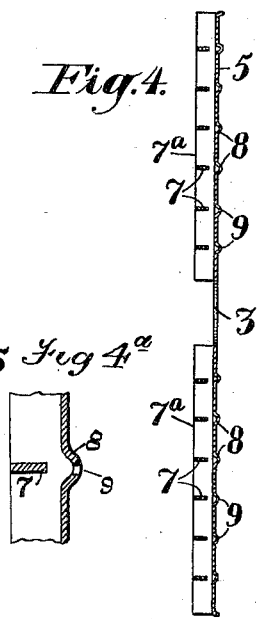
Witnesses:—
Inventor.

No. 747,268. Patented December 15, 1903.

UNITED STATES PATENT OFFICE.

STEFAN C. SZEMANSKI, OF SAN FRANCISCO, CALIFORNIA.

GOLD-SAVING DEVICE.

SPECIFICATION forming part of Letters Patent No. 747,268, dated December 15, 1903.

Application filed September 8, 1903. Serial No. 172,297. (No model.)

*To all whom it may concern:*

Be it known that I, STEFAN C. SZEMANSKI, a citizen of the United States, residing at San Francisco, in the county of San Francisco and State of California, have invented new and useful Improvements in Gold-Saving Devices, of which the following is a specification.

My invention relates to improvements in means for treating auriferous sands and gravels. Its object is to provide a washer simple in construction and operation which, among other things, is adapted to bring the finer precious particles into intimate contact with the contained mercury-baths and which will permit of the reuse of the water.

It consists of the parts and the construction and combination of parts as hereinafter more fully described, having reference to the accompanying drawings, in which—

Figure 1 is a side elevation, partly in section, of my apparatus. Fig. 2 is a plan view of same. Fig. 3 is a plan view of one of the plates. Fig. 4 is a section taken on line $x$ $x$ of Fig. 3. Fig. 4$^a$ is an enlarged section of a portion of the riffled plate.

A represents a cylindrical section forming the shell of a unit of my device. There may be one or more units, according to the nature of the sand or gravel handled. In the present instance I have shown the device as built up of three individual units, which will usually suffice.

A shallow annular mercury-pan 2, inclosing a central opening 3, is supported inside and near the bottom of a shell A, and a second mercury-pan 4, somewhat smaller than the first, but having no central opening, is supported above pan 2 and out of contact with the shell to provide an annular discharge from pan 4 into pan 2, as will be more fully explained later.

Fitting snug within the walls of pan 2 and resting immediately upon the surface of the contained mercury is an annular combined amalgam-plate and floating riffle 5, supported rigidly by brackets 6. The upper surface of plate 5 is provided with a series of concentric riffles 7, which are raised about one-eighth of an inch, allowing a limited amount of fine material to pass under the riffles. The plate is formed with concentric annular series of shallow elongated depressions 8, disposed in the planes of the riffles, for reasons to be stated later. The plate in the bottom of these depressions or pockets is perforated, as at 9, to let the finer gold particles come into contact with the mercury-bath, which fills the space between the plate and bottom of the pan. Upper pan 4 contains a similarly-riffled pocketed perforated and supported plate 10, except that the latter instead of having an opening corresponding to opening 3 is provided with a conical spreader 11, disposed axially in line with the receiving-opening above. To prevent material banking to one side of the plates more than the other, the radial riffles or strips 7$^a$ are disposed as shown. As many of these units may be built one upon another as desired, the topmost one being provided with a cover 12, having a central receiving-opening. A flexible chute or spout, as 13, through which material is fed from the stationary hopper 14, has one end secured to the hopper-discharge and the other to the flange 15 on the inside of cover 12, which allows the apparatus to be given a combined reciprocating and rotary motion without disturbing the feed.

The sections A are united in any suitable manner. I have here shown the upper edges of one section and the adjacent lower edge of a conjoined section as having respective irregular notches 16 and corresponding interlocking projections 17. This permits two or more sections to be quickly assembled or to be taken apart in case of a clean up. The seam between the sections is closed by a rubber band 18, over which is clamped a spring-band 19. The latter rests upon the brackets 20, rigid with the lower section, and carries the loops 21, embracing the brackets and preventing any rotary movement of the band about the shell.

It is desired that the apparatus should be given a gentle horizontal reciprocating and limited rotary movement when in operation. This motion may be imparted in a variety of ways. As here illustrated, the lowermost section is provided with a suitable base, in which are swiveled a number of antifrictional rollers or casters 22, running upon a rubber-covered support 23.

24 and 24' are drive-shafts operating in unison, each having a crank, crank 25 of shaft 24 having a yielding pitman 26, connecting at 27 with one side of band 19, which is locked rigid on the shell, and crank 28 of shaft 24', connecting, by a yielding member 32, similar to member 26, with band 19 at 33, which is approximately ninety degrees removed from the point of attachment of member 26. Thus cranks 25 and 28, which lie in planes at right angles to each other, act alternately through their several connections to impart a compound horizontal reciprocating and limited rotary movement to the device.

The members 26 and 32 each comprise a cylinder portion and a telescoping plunger portion having suitable spring or rubber packing on each side of the plunger, so that impulse will be given to the apparatus without shock or jar. The resilient base-support 23 tends to prevent all undesired vibration of the apparatus, as it is constantly turning on its rollers 22. The object is to simulate the gentle continuous rotary or gyratory movement that the miner gives to his "prospecting-pan" when washing out dirt by hand, thereby allowing the finer gold particles to settle to the bottom into contact with the mercury without too great agitation and flouring of the latter.

In operation the material, consisting of auriferous gravel or sand, is fed along with a suitable quantity of water into hopper 14 over a grizzly 34 or other suitable perforated surface, only the finer gravels and sands passing down through the flexible chute or throat 13 into the machine, the coarser stones being discharged over the end of the grizzly outside the hopper. Striking upon the conical deflector 11 of the upper plate 10, the material and water is spread radially over the plate, gradually working over and under the riffles until it passes over the edges of the pan 4 and discharges on the outermost riffles of the succeeding plate. Here it travels inward until it discharges through the central opening of pan 2 of the upper section upon the next succeeding plate 10, and so on, first outwardly over one set of riffles and then inwardly over a succeeding one, until final discharge takes place upon an endless foraminous conveyer 35. The latter consists of a finely-perforated metallic belting of about thirty or forty mesh supported on rubber rollers 36 and adapted to let the water pass through into a tank 37 to be used over again and to carry the gangue and barren sands to a suitable point of discharge separate from the water. A metal brush 38 may be used to assist in removing the sand from the conveyer, so that it will not be carried back over the tank. By constant backward, forward, and rotary movement of the apparatus the material is kept in gentle motion, the gangue and barren sands gradually working through the machine, the finer gold settling into the pockets 8, where it falls through to become amalgam, the coarser gold being retained on the surface of the plates between the riffles.

By disposing the pockets substantially in the plane of the riffles they receive the finer gold particles which may not settle till they and the material with which they are commingled come in contact with the riffles. If the pockets were between the riffles, much of the gold would be swept over them. As it is the gold is forced into them, since a certain amount of circulation of water and material is constantly passing under the riffles and immediately over the pockets. This is an important feature of my invention.

Having thus described my invention, what I claim, and desire to secure by Letters Patent, is—

1. In a gold-saving device, the combination of a plurality of separable units each comprising a shell, an annular contained mercury-pan, a superposed mercury-pan, corresponding riffled perforated plates in said pans resting on the surface of the mercury in said pans, a central feed to said unit upon the topmost plate, the material so fed passing first radially outward over one plate and radially inward over a succeeding plate.

2. In a gold-saving device, the combination of a plurality of superposed amalgam-plates disposed in horizontal planes and means by which material is directed alternately outward and radial of one plate and inward radially of a succeeding plate, one of said plates having a central opening and the other plate having a conical spreader disposed axially in line with said opening.

3. In a gold-saving device, a plate having a plurality of concentric riffles supported slightly above the surface of said plate and perforated pockets in the plate substantially in the planes of the riffles.

4. In a gold-saving device, a plate having a series of substantially concentric riffles slightly raised above the surface of the plate, radial partition-strips between the riffles and concentric annular series of elongated perforated pockets in the plate.

5. In a gold-saving device the combination of a shell, a mercury-pan inclosing a central opening supported within the shell, a riffled perforated plate in said pan adapted to rest on the surface of the mercury placed in the pan and a superposed mercury-pan supported out of contact with the interior of the shell and of lesser diameter than the first pan, a riffled perforated plate in said superposed pan and means by which said shell is given a limited gyratory movement.

6. In a gold-saving device, the combination of a shell inclosing successively-disposed mercury-pans, a riffled perforated plate in each of said pans adapted to rest on the surface of mercury placed in the pans, the material passing from the riffled surface of one pan to the riffled surface of the succeeding pan, and means by which said shell may be given a combined horizontal reciprocating and limited gyratory motion.

7. In a gold-saving device, the combination of a plurality of separable units each comprising a shell, and successively-arranged mercury-pans with respective riffled surfaces, roller or equivalent supports for said device, means for giving it a combined horizontal reciprocating and rotary movement, a source of material-supply, a flexible chute through which said material is delivered to the device and a foraminous conveyer upon which the material from the device is discharged and the water and said discharged material separated.

8. In a gold-saving device, the combination of a plurality of suitably-supported conjoinable sections, a flexible band embracing the sections, supports on the latter for the band and guides on the band embracing said projection to limit the movement of the band about the sections, and connections of said band with a source of power to impart a limited gyratory movement to the sections.

9. The combination with a gold-saving device including a shell and superposed riffled surfaces over which the material passes successively, of a foraminous conveyer disposed relative to the discharge of said device, a tank beneath said conveyer in which the water passing through the latter is collected, and means adjacent to one end of the conveyer by which the solid material is removed from the conveyer and discharged separate from the water.

In testimony whereof I have hereunto set my hand in presence of two subscribing witnesses.

STEFAN C. SZEMANSKI.

Witnesses:
HENRY P. TRICOU,
P. T. NOWACKI.